United States Patent Office 3,489,855

Patented Jan. 13, 1970

3,489,855

NETWORK TO DETERMINE AN AVAILABLE ROUTE THROUGH A SWITCHING NETWORK

Peter Wöhr, Stuttgart-Feuerbach, and Georg Becker, Gerlingen, Germany, assignors to International Standard Electric Corporation Filed July 14, 1966, Ser. No. 565,245
Claims priority, application Germany, July 24, 1965, St 24,177
Int. Cl. H04m 3/42
U.S. Cl. 179—18 4 Claims

ABSTRACT OF THE DISCLOSURE

Path selection system wherein an AND-circuit is provided per route section. The AND-circuit inputs are connected to the output of a counter, a seizing register and a preceding AND-circuit. The seizing register is charged from a storage of the line condition of the route sections. A control circuit advances the counter in a defined clock pulse, thereby checking one possible path after another, whereby each possible route comprising several route sections is checked in one step.

Figure 1:
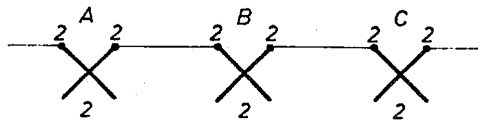

The invention relates to path selection systems for determining an available route through a switching network and more particularly, to such systems in which the line condition of the route sections are kept stored in a memory.

It is known to store the line condition of the route section of a switching network in the cells of a store or memory bank to obviate the necessity of determining the line conditioned, when establishing a connection. These storages are used with advantage particularly for centrally controlled exchange systems, because the same signals required to control the switching network can also be used simultaneously to vary the memory contents to reflect the respective line condition of sections of the switching network.

It is also known, to subdivide the memory and to arrange the cells so that the addresses of the memory cells coincide with the addresses of the route sections in the switching network. If the memory cells are arranged in a multi-dimensional co-ordinate system, then for example, one co-ordinate direction corresponds to the subdivision of the switching network into several switching stages, another co-ordinate direction correspond to the subdivision of the network into parallel switching multiple, and another co-ordinate direction corresponds to the different outputs of each switching multiple.

It is further known to consider the formation of groups in the switching network by forming corresponding groups of storage cells with sub-co-ordinates or excessive co-ordinates. These storage known arrangements have a regular structure of the switching network and of the storage as a prerogative and adhere firmly to this structure.

In the arrangements known, the path or route selection is controlled centrally and in stages. In each stage the selection depends on the line condition of the route sections. The line condition of each route section per stage are kept in one storage cell. The central control, in turn, depends on the selection in the preceding stage for determining the paths through the succeeding stages. Thus, the central control must supervise each and every phase of the selection and the selection is made in a step-by-step manner.

It is the object of the invention to create path selection systems for determining an available route through a switching network. The system comprises simultaneous network wherein the stage-by-stage connection of the selecting steps is predetermined.

The simulating network according to the invention solves the central control problem in that the seizing registers on receiving the line condition from the memory, are connected with the inputs of AND-circuits in the simulating network using logical intermeshings, representing the jumpering of the intermediate links. In addition step-by-step counters which are used for the successive testing of the possible routes are connected with other inputs of the AND-circuits. Further the outputs of the AND-circuits of a switching stage are connected either directly or through OR gates to third inputs of the AND-circuits associated with the succeeding route sections. In this network the tasks of the central control are limited, because the central control has only to control the timely process of the route search and is not concerned with the partial results of the step-by-step selection. The control circuit furnishes the clock pulses for the counters, initiates the transfer of the line condition from the memory to the line condition register and initiates through-connection of the route marked by the counter position, if a route has been reported as available.

To avoid blocking due to busy circuits in large switching networks it may be necessary to switch several simulating networks in series for determining an idle route through the actual switching network, consequently, each of the serially connected simulating networks comprises several switching stages.

It is sufficient to determine whether a route through the switching network is still available by checking all counter outputs. If all routes are seized this can be recognized with one testing cycle as no "available" indication is forwarded to the control circuit.

The above mentioned and other objects and features of the invention will become more apparent as the description proceeds, when taken in conjunction with the drawings, in which:

FIG. 1 schematically shows a simple switching network, and

Figure 2:
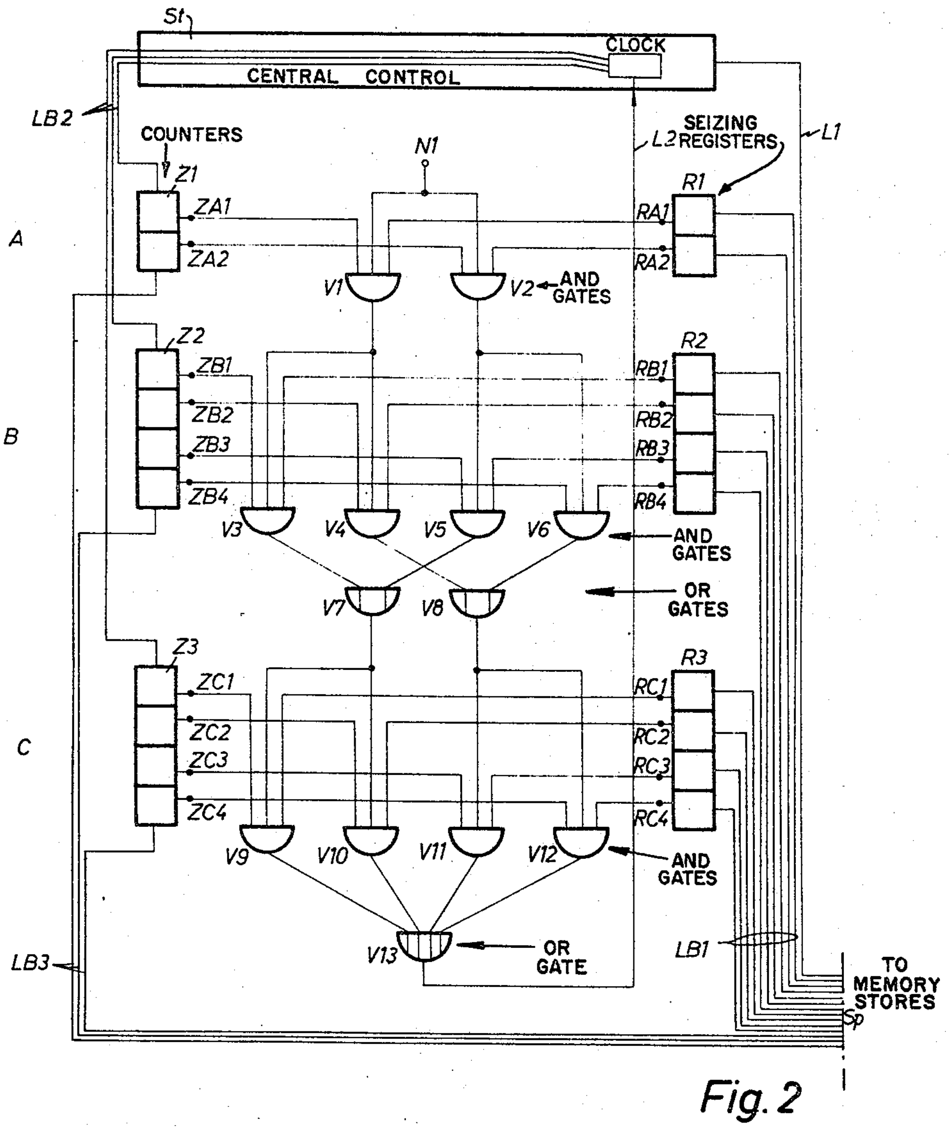

FIG. 2 shows a simulating network according to the invention used to determine an available route through the switching network according to FIG. 1.

The switching network according to FIG. 1 possesses three stages A, B and C. Each stage comprises two switch blocks, each having two outputs. At the switching network input there are always 8 possible routes, to be checked successively.

The network according to FIG. 2 consists of the counters Z1 to Z3, the logic gate connections V1 to V13 and the seizing registers R1 to R3. The figure further shows the necessary lines or line groups, respectively, within the network, leading to the central control *St* and to the memory *Sp*. A counter output, a seizing register output and an AND-circuit is associated with each route section. For example, the counter output ZB3 and the seizing register output RB3 are connected with two inputs of the corresponding AND-circuit V5. The third input of the AND-circuits is always connected with the output of the AND-circuit of the route section leading to the route section considered.

If a route section in the preceding switching stage can be reached via several other route sections, the outputs of the AND-circuits associated to said route pieces are combined through an OR-circuit, e.g., OR-circuit V7.

The input N1 serves to select one of several networks which is required, for example, in large switching networks or in case of a varying jumpering of the intermediate links.

The function of the simulating network according to the invention will be explained with the aid of an example of a path or search. A connection shall be established from a defined input of the switching stage A to an arbitrary output of the switching stage C.

The control *St* furnishes an impulse to the central storage *Sp* via the line L1. Thereupon the line conditions of the route sections are transferred from the central storage *Sp* into the register R1 to R3 via the line group LB1. The counters Z1, Z2 and Z3 receive their counting pulses from the control *St* via the line group LB2. The counter outputs ZA1 to ZC4 are marked in the sequence shown on Table 1.

TABLE 1

| Counter position | Counter outputs marked | | |
|---|---|---|---|
| 1 | ZA1 | ZB1 | ZC1 |
| 2 | ZA1 | ZB1 | ZC2 |
| 3 | ZA1 | ZB2 | ZC3 |
| 4 | ZA1 | ZB2 | ZC4 |
| 5 | ZA2 | ZB3 | ZC1 |
| 6 | ZA2 | ZB3 | ZC2 |
| 7 | ZA2 | ZB4 | ZC3 |
| 8 | ZA2 | ZB4 | ZC4 |

It is now assumed that the input N1 is marked, that the counters take the position 3 according to Table 1 and that the register outputs RA1, RB2 and RC3 of the seizing registers R1 to R3, corresponding to said counter position, are marked too, which means the corresponding route sections are available. In this condition an output signal appears at the AND-circuit V1, at the AND-circuit V4, at the OR-circuit V8, at the AND-circuit V11 and consequently also at the OR-circuit V13. The output signal of the OR-circuit V13 is led to the control *St* via the line L2 control *St* thereupon disconnects the clock pulse. The counter position serves as a criterion for the possible route found idle, and is led to the storage via the line group LB3. In said memory *Sp* the storage cells of the route sections selected are marked as being seized and the connection is established in the switching network. Marking of the register R1 to R3 is canceled or a new marking is entered at the following searching process.

For further explanation another case will be described now namely that the input N1 is marked, that the counters are in counting position 3 according to Table 1 and that the corresponding register outputs RA1 and RB2 are marked, while the register output RC3 is not marked. Output signals appear at the AND-circuit V1, at the AND-circuit V4 and at the OR-circuit V8. As the register output RC3 is not marked only two of the three inputs of the AND-circuit V11 are marked, its output remains unmarked and consequently no signal can reach the control *St* via the OR-circuit V13 and via the line L2, the control therefore cannot switch off the clock pulses. During the following clock pulse the counter position 4 according to Table 1 is checked.

It may occur in large switching networks that an available connecting route, having been selected in a network according to the invention, cannot be used, because no available route continuation is found, for example. In such a case the route search must be repeated in this section. However, it must be prevented at the repetition that the same output is selected again for which no available route continuation has been found. This can be achieved in two ways. The route sections for which no available route continuation has been found can be marked as simulatingly seized, it is thereby sufficient to mark the output of the last successfully interrogated switching stage as seized. But it is also possible to set the counters Z1 to Z3 at the commencement of a route search into the next following counter position according to Table 1, not having been checked yet during the last route search, so that all possible routes are checked cyclically.

While the principles of the invention have been described above in connection with specific apparatus and applications, it is to be understood that this description is made only by way of example and not as a limitation on the scope of the invention.

What is claimed is:

1. A simulating network for selecting an available path through a multi-stage switching network wherein each stage may have a plurality of possible path sections, and in which the line conditions of the path sections are maintained in a memory, said simulating network comprising seizing register means, said register means comprising a register per section per stage, means for transferring the line conditions from the memory to the seizing register means, counter means comprising a counter per stage having an output per path section for providing successive signals on said outputs, central control means containing a clock for providing pulses to step said counter means, an AND gate per path section per stage for simulating the path sections in each stage of said multi-stage switching network, means for coupling said receiving registers per path section per stage to each of said AND gates simulating the same path sections per stage respectively, means for coupling said counter outputs per path section stage to each of said AND gates respectively, means for marking an input of each of said AND gates simulating path sections in said first stage, means for coupling the outputs of each stage simulating AND gate to the AND gates simulating path sections in the next succeeding stage, means for coupling the outputs of the AND gates simulating path sections in the last stage to said control means, said control means operated responsive to a signal from any of said last stage AND gates to stop said clock pulses from being transmitted to said counter to thereby stop said counter, and means for coupling said counters to the memory means to transmit said counter position when the counter is stopped to control the switching through of paths sections indicated by said stopped counter position.

2. The simulating network of claim 1 wherein said means for coupling the outputs of said AND gates to the AND gates of the succeeding stages includes first OR gate means.

3. The simulating network of claim 2 wherein said means for coupling the AND gate simulating the last stage to said control means comprises a last stage OR gate.

4. The simulating network of claim 1 wherein the marking inputs to said first stage AND gates are all common, whereby one of a plurality of simulating networks can be selected.

References Cited

UNITED STATES PATENTS 3,242,265 3/1966 Benmussa et al. ------ 179—18

RALPH D. BLAKESLEE, Primary Examiner